(12) United States Patent
Novack et al.

(10) Patent No.: US 8,719,911 B2
(45) Date of Patent: May 6, 2014

(54) METHODS, SYSTEMS, AND COMPUTER PROGRAM PRODUCTS FOR AUTHENTICATING AN IDENTITY OF A USER BY GENERATING A CONFIDENCE INDICATOR OF THE IDENTITY OF THE USER BASED ON A COMBINATION OF MULTIPLE AUTHENTICATION TECHNIQUES

(75) Inventors: Brian Novack, St. Louis, MO (US); Jerry Birkes, Santa Clarita, CA (US); Alton Drake, Atlantic Highlands, NJ (US); Gary Toretti, Flower Mound, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 655 days.

(21) Appl. No.: 12/968,964

(22) Filed: Dec. 15, 2010

(65) Prior Publication Data

US 2012/0159590 A1   Jun. 21, 2012

(51) Int. Cl.
*H04L 29/06* (2006.01)
*G06F 21/31* (2013.01)
*G06F 21/32* (2013.01)
*G06F 21/34* (2013.01)

(52) U.S. Cl.
CPC ............... *G06F 21/31* (2013.01); *G06F 21/32* (2013.01); *G06F 21/34* (2013.01)

USPC ............................................................. 726/7

(58) Field of Classification Search
CPC .......... G06F 21/31; G06F 21/32; G06F 21/34
USPC ............................................................ 726/7
See application file for complete search history.

(56) References Cited

U.S. PATENT DOCUMENTS

| | | | |
|---|---|---|---|
| 2006/0210119 A1* | 9/2006 | Willis et al. | 382/115 |
| 2008/0010674 A1* | 1/2008 | Lee | 726/7 |
| 2009/0187962 A1* | 7/2009 | Brenneman et al. | 726/1 |
| 2010/0132019 A1* | 5/2010 | Hardt | 726/6 |
| 2011/0153496 A1* | 6/2011 | Royyuru | 705/44 |
| 2012/0054826 A1* | 3/2012 | Asim et al. | 726/1 |

\* cited by examiner

*Primary Examiner* — Michael S McNally
(74) *Attorney, Agent, or Firm* — Myers Bigel Sibley & Sajovec, PA (57) ABSTRACT

A user's identity is authenticated by evaluating the identity of the user using a plurality of authentication techniques, the plurality of authentication techniques generating a plurality of numerical confidence indicators, respectively, of the identity of the user, associating a plurality of authentication technique weights with the plurality of numerical confidence indicators, respectively, and calculating a weighted combination of the respective numerical confidence indicators using the plurality of authentication technique weights to generate a composite numerical confidence indicator of the identity of the user.

14 Claims, 4 Drawing Sheets

METHODS, SYSTEMS, AND COMPUTER PROGRAM PRODUCTS FOR AUTHENTICATING AN IDENTITY OF A USER BY GENERATING A CONFIDENCE INDICATOR OF THE IDENTITY OF THE USER BASED ON A COMBINATION OF MULTIPLE AUTHENTICATION TECHNIQUES

BACKGROUND

The present disclosure relates generally to computer system and network security and, more particularly, to methods, systems, computer program products for authenticating a user of a computer system and/or network.

Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. The user does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

Figure 1:
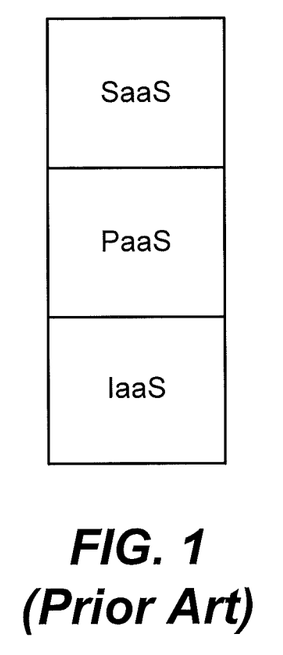
FIG. 1 is a block diagram that illustrates a conventional cloud computing paradigm.

FIG. 1 illustrates a conventional cloud service model that includes Infrastructure as a Service (IaaS), Platform as a Service (PaaS), and Software as a Service (SaaS). Infrastructure as a Service, delivers computer infrastructure—typically a platform virtualization environment—as a service. Rather than purchasing servers, software, data-center space or network equipment, clients instead buy those resources as a fully outsourced service. Suppliers typically bill such services on a utility computing basis and the amount of resources consumed. Platform as a Service delivers a computing platform as a service. It provides an environment for the deployment of applications without the need for a client to buy and manage the underlying hardware and software layers. Software as a Service delivers software services over the Internet, which reduces or eliminates the need for the client to install and run an application on its own computers, which may simplify maintenance and support.

Enterprises typically use some form of authentication technique as part of restricting user access to resources. It is not uncommon for an enterprise to use different techniques for authenticating users to access different resources. For example, employees may need to enter only a password to access a general computing system. Departments and/or areas of the company that contain confidential information, however, may be protected by requiring users to both enter a password and also possess a hardware token for access. An enterprise can, thus, use many different types of authentication techniques to access a variety of different secure resources. Because of the number of authentication techniques that may be used and the number of resources that may be protected, it may be difficult to develop an authentication policy for an enterprise that protects the enterprise's resources in an effective and efficient manner.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method of authenticating an identity of a user, comprising evaluating the identity of the user using a plurality of authentication techniques, the plurality of authentication techniques generating a plurality of numerical confidence indicators, respectively, of the identity of the user, associating a plurality of authentication technique weights with the plurality of numerical confidence indicators, respectively, and calculating a weighted combination of the respective numerical confidence indicators using the plurality of authentication technique weights to generate a composite numerical confidence indicator of the identity of the user.

In other embodiments, the plurality of authentication techniques comprises an authentication technique based on knowledge associated with the user, an authentication technique based on a possession associated with the user, and an authentication technique based on an innate characteristic associated with the user.

In still other embodiments, one of the plurality of authentication techniques uses a plurality of authentication factors to generate one of the plurality of numerical confidence indicators. The method further comprises using the plurality of authentication factors to generate a plurality of numerical confidence sub-indicators, respectively, of the identity of the user, associating a plurality authentication factor weights with the plurality of numerical confidence sub-indicators, respectively, and calculating a weighted combination of the respective numerical confidence sub-indicators to generate the one of the plurality of numerical confidence indicators.

In still other embodiments, the authentication technique based on the knowledge associated with the user uses the plurality of authentication factors and wherein the plurality of authentication factors comprises a password and a personal identification number.

In still other embodiments, the authentication technique based on the possession associated with the user uses the plurality of authentication factors and wherein the plurality of authentication factors comprises a smart card and a hardware token.

In still other embodiments, the authentication technique based on the innate characteristic associated with the user uses the plurality of authentication factors and wherein the plurality of authentication factors comprises a fingerprint, an iris scan, a voice spectral analysis, and a signature analysis.

In still other embodiments, the method further comprises comparing the numerical confidence indicator with a threshold value to generate a comparison result and determining whether the identity of the user is authenticated based on the comparison result.

In still other embodiments, comparing the numerical confidence indicator with a threshold value comprises comparing the numerical confidence indicator with a plurality of threshold values to generate the comparison result. The method further comprising determining a qualitative confidence level in whether the identity of the user is authentic based on the comparison result.

In still other embodiments, the threshold value is associated with a resource. The method further comprises receiving the threshold value from a party having control over access to the resource.

In still other embodiments, the method further comprises receiving a request from a party seeking confirmation of the identity of the user and communicating the composite numerical confidence indicator to the party seeking confirmation of the identity of the user.

In still other embodiments, the method further comprises receiving the plurality of authentication technique weights from the party seeking confirmation of the identity of the user.

In still other embodiments, the plurality of authentication techniques comprises a bi-lateral authentication technique and a non-bi-lateral authentication technique.

In still other embodiments, the method further comprises using a non-bi-lateral authentication technique to obtain identity information and determining at least one of the plurality of authentication technique weights based on the identity information obtained using the non-bi-lateral authentication technique.

Further embodiments provide a system for authenticating an identity of a user comprises a processor and a memory coupled to the processor having computer readable program code stored therein that is configured to cause the processor to evaluate the identity of the user using a plurality of authentication techniques, the plurality of authentication techniques generating a plurality of numerical confidence indicators, respectively, of the identity of the user, to associate a plurality of authentication technique weights with the plurality of numerical confidence indicators, respectively, and to calculate a weighted combination of the respective numerical confidence indicators using the plurality of authentication technique weights to generate a composite numerical confidence indicator of the identity of the user.

In still further embodiments, the plurality of authentication techniques comprises an authentication technique based on knowledge associated with the user, an authentication technique based on a possession associated with the user, and an authentication technique based on an innate characteristic associated with the user.

In still further embodiments, one of the plurality of authentication techniques uses a plurality of authentication factors to generate one of the plurality of numerical confidence indicators, the computer readable program code being further configured to use the plurality of authentication factors to generate a plurality of numerical confidence sub-indicators, respectively, of the identity of the user, to associate a plurality authentication factor weights with the plurality of numerical confidence sub-indicators, respectively, and to calculate a weighted combination of the respective numerical confidence sub-indicators to generate the one of the plurality of numerical confidence indicators.

In still further embodiments, the computer readable program code is further configured to compare the numerical confidence indicator with a threshold value to generate a comparison result and to determine whether the identity of the user is authenticated based on the comparison result.

In still further embodiments, the computer readable program code is further configured to receive a request from a party seeking confirmation of the identity of the user and to communicate the composite numerical confidence indicator to the party seeking confirmation of the identity of the user.

Other embodiments provide an article of manufacture for authenticating an identity of a user comprises a non-transitory computer readable storage medium having computer readable program code embodied therein. The computer readable program code comprises computer readable program code configured to evaluate the identity of the user using a plurality of authentication techniques, the plurality of authentication techniques generating a plurality of numerical confidence indicators, respectively, of the identity of the user, computer readable program code configured to associate a plurality of authentication technique weights with the plurality of numerical confidence indicators, respectively, and computer readable program code configured to calculate a weighted combination of the respective numerical confidence indicators using the plurality of authentication technique weights to generate a composite numerical confidence indicator of the identity of the user.

In still other embodiments, the plurality of authentication techniques comprises an authentication technique based on knowledge associated with the user, an authentication technique based on a possession associated with the user, and an authentication technique based on an innate characteristic associated with the user.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, exemplary embodiments may be embodied in hardware and/or in software (including firmware, resident software, microcode, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments described herein are based on the concept of providing an authentication service for authenticating the identity of a user in which multiple authentication techniques can be used to authenticate the user and the results of the different authentication techniques combined to generate a composite confidence indicator with respect to the identity of the user. In some embodiments, the authentication service can be provided in a cloud service model so that an enterprise need not implement its own authentication protocols, but instead can customize a cloud authentication service that provides a desired level of security and efficiency. For example, a numerical confidence indicator regarding the identity of the user may be generated for each of the authentication techniques and, then, these indicators may be combined to generate the composite confidence indicator of the identity of the user. As some authentication techniques may be more reliable than others, an enterprise may assign weight factors for the various techniques to either emphasize or deemphasize numerical confidence indicators for the various authentication techniques in computing the composite confidence indicator. The final composite confidence indicator may be viewed as a score that is compared to one or more thresholds to evaluate whether the identity of the user is sufficiently authenticated to be granted access to some restricted resource. For highly confidential resources, an enterprise may desire a high confidence level that a user's identity is authentic before granting access to the resource while for less confidential resources a relatively low confidence level that the user's identity is authentic may be sufficient to grant access to the resource.

Figure 2:
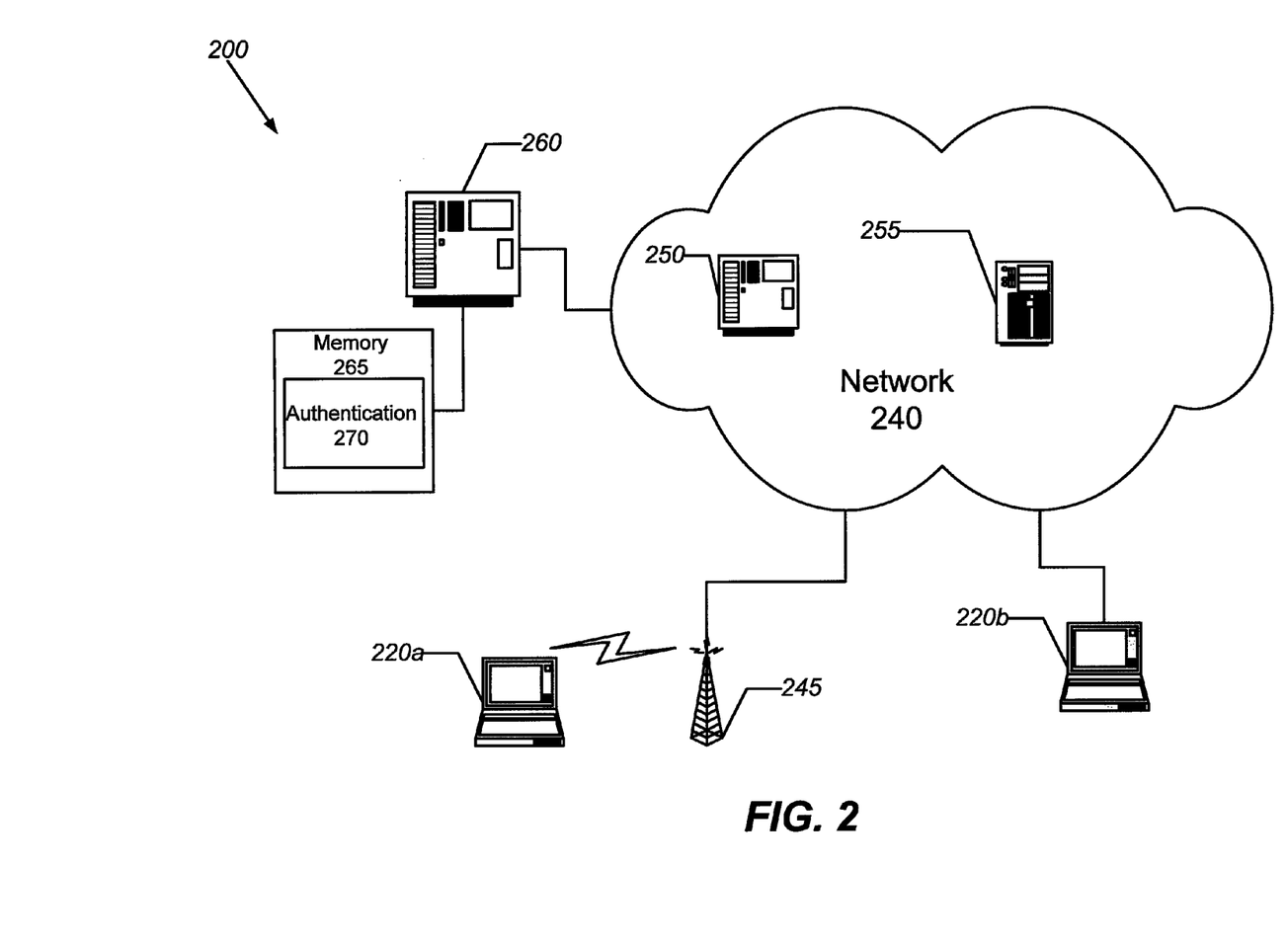
FIG. 2 is a block diagram of a communication network that includes an authentication server that is configured to generate a confidence indicator of the identity of a user based on a combination of multiple authentication techniques according to some embodiments.

Referring now to FIG. 2, a communication network 200 includes an authentication server 260 that is configured to authenticate the identity of a user by combining multiple authentication techniques to generate a composite numerical confidence indicator of the identity of the user. The communication network 200 comprises devices 220a and 220b that communicate with resources 250 and 255 over a network 240. The network 240 may represent a global network, such as the Internet, or other publicly accessible network. The network 240 may also, however, represent a wide area network, a local area network, an Intranet, or other private network, which may not accessible by the general public. Furthermore, the network 240 may represent a combination of public and private networks or a virtual private network (VPN). The network 240 includes a wireless base station transceiver 245 that may facilitate wireless communication with the mobile device 220a.

The authentication server 260 is equipped with a memory 265 that is representative of the one or more memory devices containing the software and data used to authenticate the identity of a user by combining multiple authentication techniques to generate a composite numerical confidence indicator of the identity of the user. The memory 265 may include, but is not limited to, the following types of devices: cache, ROM, PROM, EPROM, EEPROM, flash, SRAM, and DRAM. As shown in FIG. 2, the memory 265 may contain an authentication module 270 that is configured to process the results from one or more authentication techniques applied to authenticate the identity of a user and to generate the composite numerical confidence indicator of the identity of the user based on the results of these authentication techniques.

Although FIG. 2 illustrates an exemplary communication network and an exemplary hardware/software architecture that may be used in a data processing system, such as the authentication server 260, for authenticating the identity of a user by combining multiple authentication techniques to generate a composite numerical confidence indicator of the identity of the user, it will be understood that embodiments of the present invention are not limited to such a configuration but are intended to encompass any configuration capable of carrying out operations described herein.

Computer program code for carrying out operations of data processing systems and servers described above with respect to FIG. 2, such as the authentication server 260, may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Figure 3:
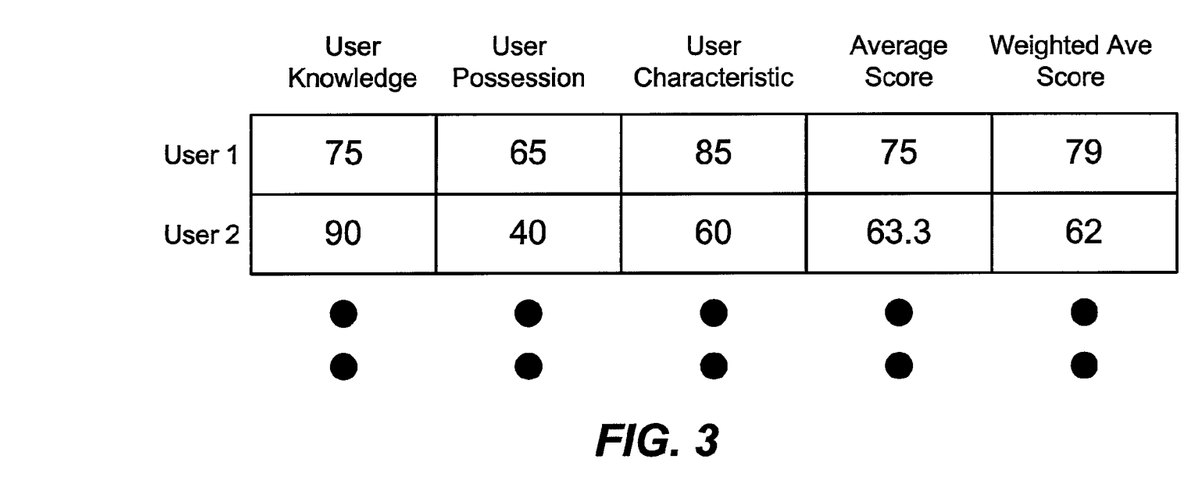
FIGS. 3 and 4 are tables that illustrate operations for generating a numerical composite confidence indicator of the identity of a user according to some embodiments.

FIG. 3 is a table that illustrates operations for authenticating the identity of a user by combining multiple authentication techniques according to some embodiments. In the example of FIG. 3, three different categories of authentication techniques are used: an authentication technique based on knowledge associated with the user, an authentication technique based on a possession associated with the user, and an authentication technique based on an innate characteristic associated with the user. While this is one way to differentiate between authentication techniques, another way to differentiate authentication techniques is based on whether the authentication is a bi-lateral technique or non-bi-lateral technique. A bi-lateral authentication technique is one in which the user and the authenticator agree on the terms of the technique and the user is responsible for meeting the terms to be authenticated. Examples include, but are not limited to, passwords, Personal Identification Numbers (PINs), and the like. A non-bi-lateral technique is one in which the authenticator may or may not determine the terms of the authentication, but the user is a passive participant in determining whether the terms have been satisfied. Examples include, but are not limited to, an authenticator monitoring the location in which a device is used (e.g., if a device is used in a state that it has never been used in before), monitoring usage of a device, monitoring purchases (e.g., type, location, and/or time), monitoring Short Message Service (SMS) usage, etc. A user may be given a score that may be considered a numerical confidence indicator of the user's identity based on the particular authentication technique used. As shown in FIG. 3, User 1 has scores of 75, 65, and 85 for the three respective authentication technique categories with an average score over the three authentication techniques of 75. Similarly, User 2 has scores of 90, 40, and 60 over the three categories with an average score of 63.3. The average score of the three authentication technique categories may be considered a composite numerical confidence indicator of the identity of the user. An enterprise may, however, want to place more emphasis on some authentication techniques than other authentication techniques as different techniques may be more reliable, accurate, etc. In some embodiments, an enterprise may provide weights to the authentication server 260 to weight the scores for the authentication techniques. In the example shown in FIG. 3, the score for the user characteristic technique is given three times the weight of the user possession score and the user knowledge score, which are weighted equally, to generate weighted average scores of 79 and 62 for User 1 and User 2, respectively. For purposes of illustration, averaging and weighted averaging are used to combine the scores from the various authentication techniques. It will be understood that the scores can be combined in other ways to generate a composite numerical confidence indicator of the identity of the user in accordance with various embodiments.

In some embodiments, other factors may be used to determine the weight to apply to a particular authentication technique. For example, the weight to apply to a bi-lateral authentication technique may be influenced based on non-bi-lateral technique information. For example, a user may provide a PIN number at a bank location. It may be determined, however, that the user has had unusual phone usage this day and the bank location is one in which the user has never frequented before. These non-bi-lateral authentication techniques/factors may be used to reduce the weight applied to the accurate PIN number because it may be likely that the user is an imposter who has stolen the real user's phone and PIN number.

Figure 4:
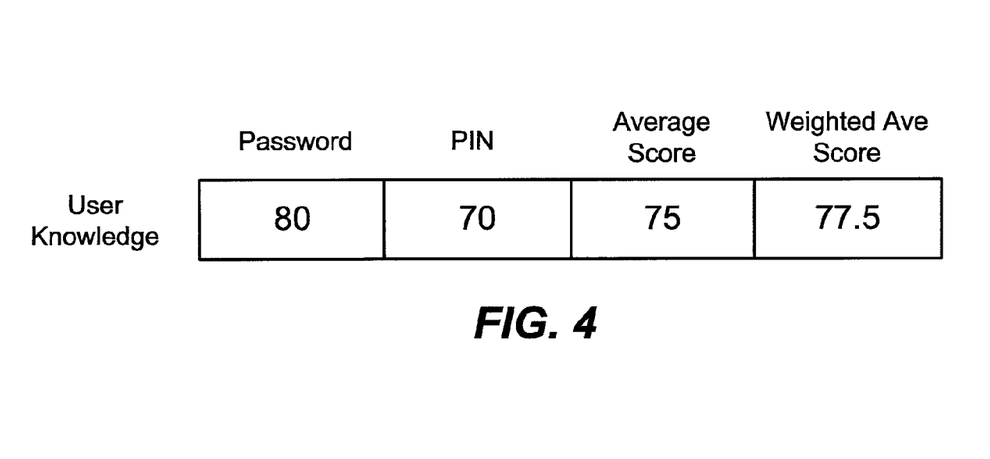

Just as multiple authentication techniques can be used to generate multiple numerical confidence indicators of the identity of the user, an individual authentication technique may use multiple authentication factors to generate a numerical confidence indicator score. Referring to FIG. 4, the user knowledge authentication technique may use a password authentication factor and a PIN authentication factor to generate numerical confidence sub-indicator scores for each of the authentication factors that can be combined to generate the score for the overall authentication technique. In the example shown in FIG. 4, the scores for the password factor and PIN factor are used to generate an average score of 75 and a weighted average score of 77.5 when the password score is weighted twice as much as the PIN score. For purposes of illustration, averaging and weighted averaging are used to combine the scores for the various authentication factors. It will be understood that the scores can be combined in other ways to generate the score to be used as the numerical confidence indicator of the identity of the user for the overall authentication technique in accordance with various embodiments.

Other authentication techniques may use multiple authentication factors as well in accordance with various embodiments. For example, the user possession authentication technique may include, but is not limited to, such authentication factors as a smart card and a hardware token. The user characteristic authentication technique may include, but is not limited to, such authentication factors as a fingerprint, an iris scan, a voice spectral analysis, and a signature analysis.

Exemplary embodiments are described herein with reference to flowchart and/or block diagram illustrations of methods, systems, and computer program products in accordance with exemplary embodiments. These flowchart and/or block diagrams further illustrate exemplary operations for authenticating the identity of a user by combining multiple authentication techniques to generate a composite numerical confidence indicator of the identity of the user, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 5:
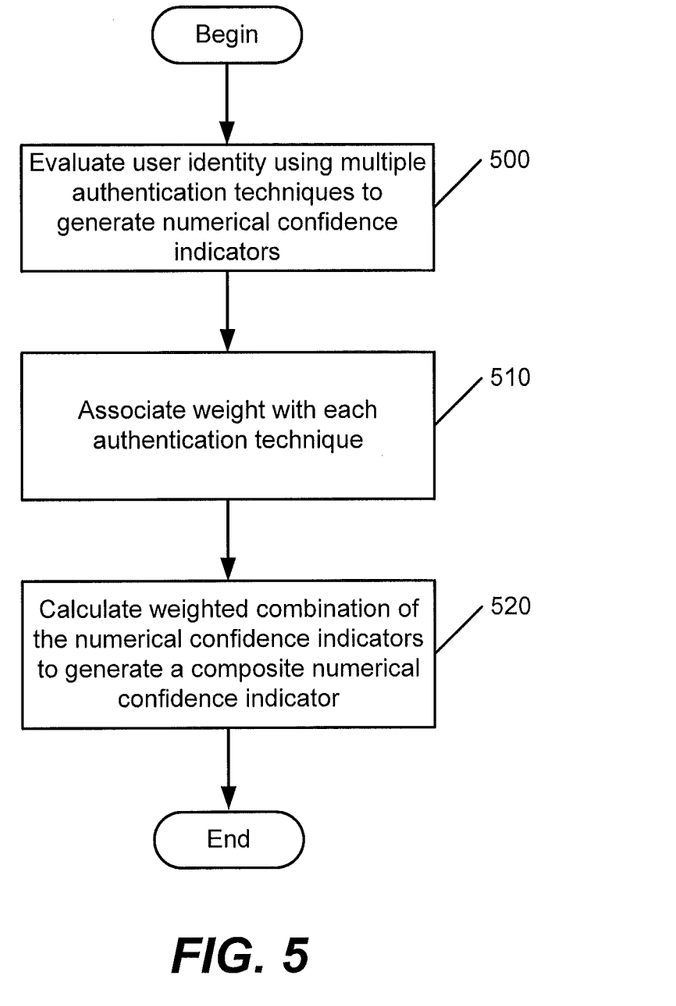
FIG. 5 is a flowchart that illustrates operations for generating a confidence indicator of the identity of a user based on a combination of multiple authentication techniques according to some embodiments.

Referring now to FIG. 5, exemplary operations for authenticating the identity of a user by combining multiple authentication techniques to generate a composite numerical confidence indicator of the identity of a user begin at block 500 where a user's identity is evaluated using multiple authentication techniques to generate a multiple numerical confidence indicators, respectively. These confidence indicators can be numerical scores as described above with respect to FIGS. 3 and 4 according to some embodiments. Each authentication technique may have a weight associated therewith (block 510), which may be provided by an enterprise seeking to verify the identity of a user for access to one or more restricted resources. These weights may allow the enterprise to emphasize one or more authentication techniques over other authentication technique(s) in making a final determination whether the user's identity is authentic. At block 520, the authentication server 260 combines the weighted numerical confidence indicator to generate a composite numerical confidence indicator of the identity of the user. This composite numerical confidence indicator may be communicated to another party, such as an enterprise that subscribes to an authentication service provided through the authentication server 260 that has control over access to a resource in response to a request or automatically based on prior agreement. The party may then use the numerical confidence indicator to decide whether the party is sufficiently authenticated to be granted access to one or more access restricted resources. In some embodiments, the composite numerical confidence indicator for a particular user may be sufficient to gain access to some resources, but not others depending on the degree of security associated with the various resources.

In some embodiments, the composite numerical confidence indicator may be compared to one or more threshold values to obtain a qualitative confidence level in whether the identity of the user is authentic. For example, the authentication server may provide a qualitative evaluation of highly authentic if the composite numerical confidence indicator is above a first threshold, authentic if the composite numerical confidence indicator is between the first threshold and a second threshold, likely inauthentic if the composite numerical confidence indicator is between the second threshold and a third threshold, and inauthentic if the composite numerical confidence indicator is less than the third threshold. The various thresholds may be provided to the authentication server 260 by a party or enterprise that uses the authentication service.

The flowchart of FIG. 5 illustrates the architecture, functionality, and operations of some embodiments of methods, systems, and computer program products for authenticating the identity of a user by combining multiple authentication techniques to generate a composite numerical confidence indicator of the identity of a user. In this regard, each block represents a module, segment, or portion of code, which comprises one or more executable instructions for implementing the specified logical function(s). It should also be noted that in other implementations, the function(s) noted in the blocks may occur out of the order noted in FIG. 5. For example, two blocks shown in succession may, in fact, be executed substantially concurrently or the blocks may sometimes be executed in the reverse order, depending on the functionality involved.

According to some embodiments described above, an authentication service may be provided in a cloud computing paradigm, for example, in which multiple authentication techniques can be used and combined to generate a composite numerical confidence indicator of the identity of the user. A client subscribing to such an authentication service may weight various authentication techniques higher and lower as desired to emphasize and/or deemphasize the different techniques. A client may also provide one or more thresholds that can be used as standard(s) to determine whether a user is sufficiently authenticated to be granted access to a particular resource. An authentication service in accordance with the embodiments described above may allow an enterprise to better manage its security by facilitating use of different authentication standards for different resources depending on the level of security that is desired. Moreover, authentication techniques can be readily emphasized or deemphasized as desired and changes to authentication thresholds can be easily made allowing an enterprise to customize its authentication protocols to enhance security and efficiency.

Many variations and modifications can be made to the preferred embodiments without substantially departing from the principles of the present invention. All such variations and modifications are intended to be included herein within the scope of the present invention, as set forth in the following claims.

The invention claimed is:

1. A method of authenticating an identity of a user, comprising:

evaluating the identity of the user using a plurality of authentication techniques, the plurality of authentication techniques generating a plurality of numerical confidence indicators, respectively, of the identity of the user;

associating a plurality of authentication technique weights with the plurality of numerical confidence indicators, respectively; and calculating a weighted combination of the respective numerical confidence indicators using the plurality of authentication technique weights to generate a composite numerical confidence indicator of the identity of the user;

wherein the plurality of authentication techniques comprises an authentication technique based on knowledge associated with the user, an authentication technique based on a possession associated with the user, and an authentication technique based on an innate characteristic associated with the user;

wherein one of the plurality of authentication techniques uses a plurality of authentication factors to generate one of the plurality of numerical confidence indicators, the method further comprising:

using the plurality of authentication factors to generate a plurality of numerical confidence sub-indicators, respectively, of the identity of the user;

associating a plurality authentication factor weights with the plurality of numerical confidence sub-indicators, respectively; and calculating a weighted combination of the respective numerical confidence sub-indicators to generate the one of the plurality of numerical confidence indicators; and wherein the authentication technique based on the possession associated with the user uses the plurality of authentication factors and wherein the plurality of authentication factors comprises a smart card and a hardware token.

2. The method of claim 1, wherein the authentication technique based on the knowledge associated with the user uses the plurality of authentication factors and wherein the plurality of authentication factors comprises a password and a personal identification number.

3. The method of claim 1, wherein the authentication technique based on the innate characteristic associated with the user uses the plurality of authentication factors and wherein the plurality of authentication factors comprises a fingerprint, an iris scan, a voice spectral analysis, and a signature analysis.

4. The method of claim 1, further comprising:
comparing the numerical confidence indicator with a threshold value to generate a comparison result; and
determining whether the identity of the user is authenticated based on the comparison result.

5. The method of claim 4, wherein comparing the numerical confidence indicator with a threshold value comprises comparing the numerical confidence indicator with a plurality of threshold values to generate the comparison result, the method further comprising:
determining a qualitative confidence level in whether the identity of the user is authentic based on the comparison result.

6. The method of claim 4, wherein the threshold value is associated with a resource, the method further comprising:
receiving the threshold value from a party having control over access to the resource.

7. The method of claim 1, further comprising:
receiving a request from a party seeking confirmation of the identity of the user; and
communicating the composite numerical confidence indicator to the party seeking confirmation of the identity of the user.

8. The method of claim 7, further comprising:
receiving the plurality of authentication technique weights from the party seeking confirmation of the identity of the user.

9. The method of claim 1, wherein the plurality of authentication techniques comprises a bi-lateral authentication technique and a non-bi-lateral authentication technique.

10. The method of claim 1, further comprising:
using a non-bi-lateral authentication technique to obtain identity information; and
determining one of the plurality of authentication technique weights based on the identity information obtained using the non-bi-lateral authentication technique.

11. A system for authenticating an identity of a user, comprising:
a processor; and
a memory coupled to the processor having computer readable program code stored therein that when executed by the processor causes the processor to perform operations comprising:
evaluating the identity of the user using a plurality of authentication techniques, the plurality of authentication techniques generating a plurality of numerical confidence indicators, respectively, of the identity of the user;
associating a plurality of authentication technique weights with the plurality of numerical confidence indicators, respectively; and
calculating a weighted combination of the respective numerical confidence indicators using the plurality of authentication technique weights to generate a composite numerical confidence indicator of the identity of the user;
wherein the plurality of authentication techniques comprises an authentication technique based on knowledge associated with the user, an authentication technique based on a possession associated with the user, and an authentication technique based on an innate characteristic associated with the user;
wherein one of the plurality of authentication techniques uses a plurality of authentication factors to generate one of the plurality of numerical confidence indicators, the operations further comprising:
using the plurality of authentication factors to generate a plurality of numerical confidence sub-indicators, respectively, of the identity of the user;
associating a plurality authentication factor weights with the plurality of numerical confidence sub-indicators, respectively; and
calculating a weighted combination of the respective numerical confidence sub-indicators to generate the one of the plurality of numerical confidence indicators; and
wherein the authentication technique based on the possession associated with the user uses the plurality of authentication factors and wherein the plurality of authentication factors comprises a smart card and a hardware token.

12. The system of claim 11, wherein the to operations further comprise:
comparing the numerical confidence indicator with a threshold value to generate a comparison result; and
determining whether the identity of the user is authenticated based on the comparison result.

13. The system of claim 11, wherein the operations further comprise:
receiving a request from a party seeking confirmation of the identity of the user; and
communicating the composite numerical confidence indicator to the party seeking confirmation of the identity of the user.

14. An article of manufacture for authenticating an identity of a user, comprising:
a non-transitory computer readable storage medium comprising computer readable program code embodied in the medium that when executed by a processor causes the processor to perform operations, comprising:
evaluating the identity of the user using a plurality of authentication techniques, the plurality of authentication techniques generating a plurality of numerical confidence indicators, respectively, of the identity of the user;
associating a plurality of authentication technique weights with the plurality of numerical confidence indicators, respectively; and
calculating a weighted combination of the respective numerical confidence indicators using the plurality of authentication technique weights to generate a composite numerical confidence indicator of the identity of the user;
wherein the plurality of authentication techniques comprises an authentication technique based on knowledge associated with the user, an authentication technique based on a possession associated with the user, and an authentication technique based on an innate characteristic associated with the user;
wherein one of the plurality of authentication techniques uses a plurality of authentication factors to generate one of the plurality of numerical confidence indicators, the operations further comprising:
using the plurality of authentication factors to generate a plurality of numerical confidence sub-indicators, respectively, of the identity of the user;

associating a plurality authentication factor weights with the plurality of numerical confidence sub-indicators, respectively; and calculating a weighted combination of the respective numerical confidence sub-indicators to generate the one of the plurality of numerical confidence indicators; and wherein the authentication technique based on the possession associated with the user uses the plurality of authentication factors and wherein the plurality of authentication factors comprises a smart card and a hardware token.

* * * * *